May 24, 1938.  B. BERGEN  2,118,640
CHILD'S VEHICLE
Filed July 24, 1937   2 Sheets-Sheet 1
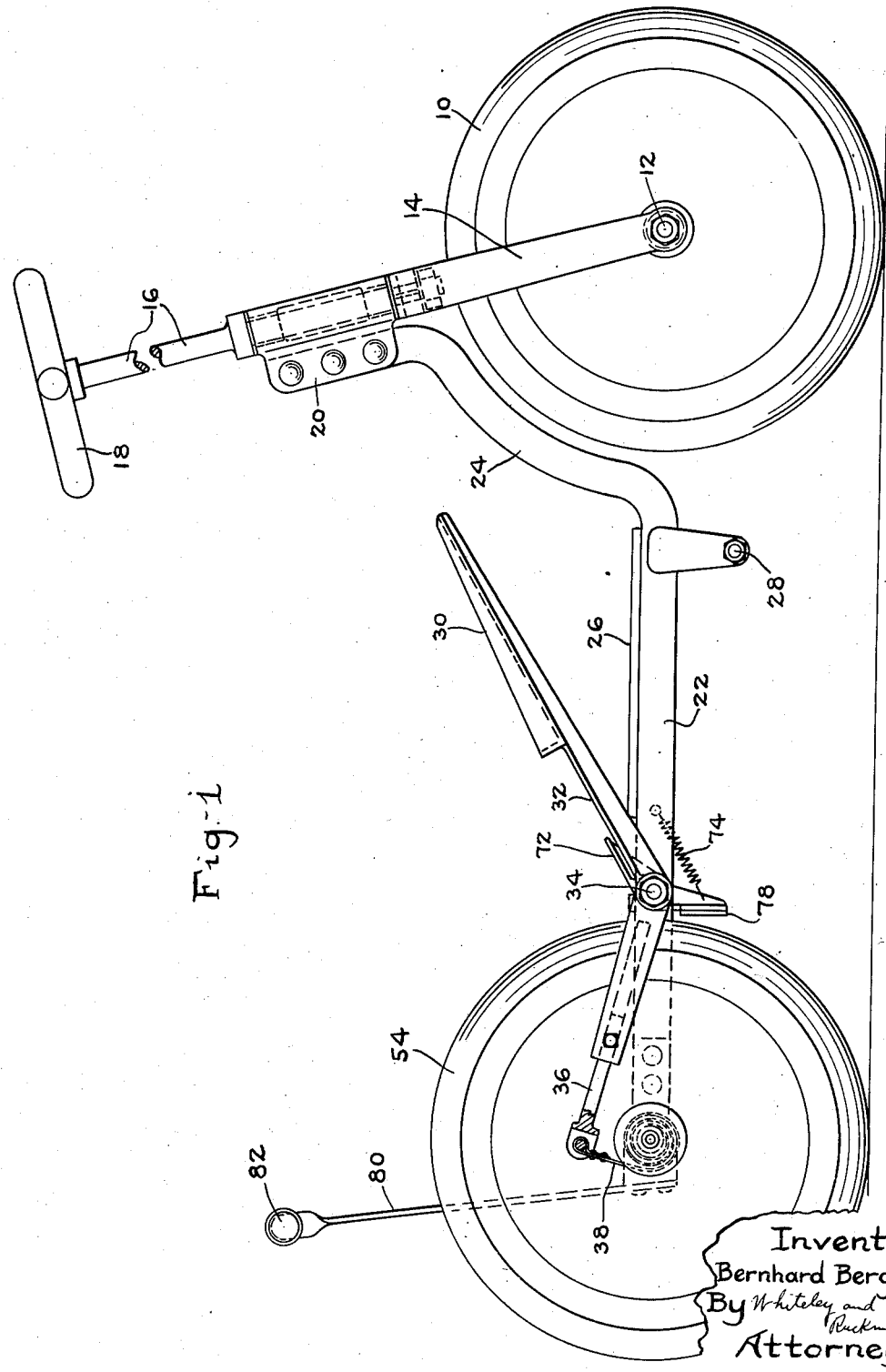

May 24, 1938.  B. BERGEN  2,118,640
CHILD'S VEHICLE
Filed July 24, 1937  2 Sheets-Sheet 2
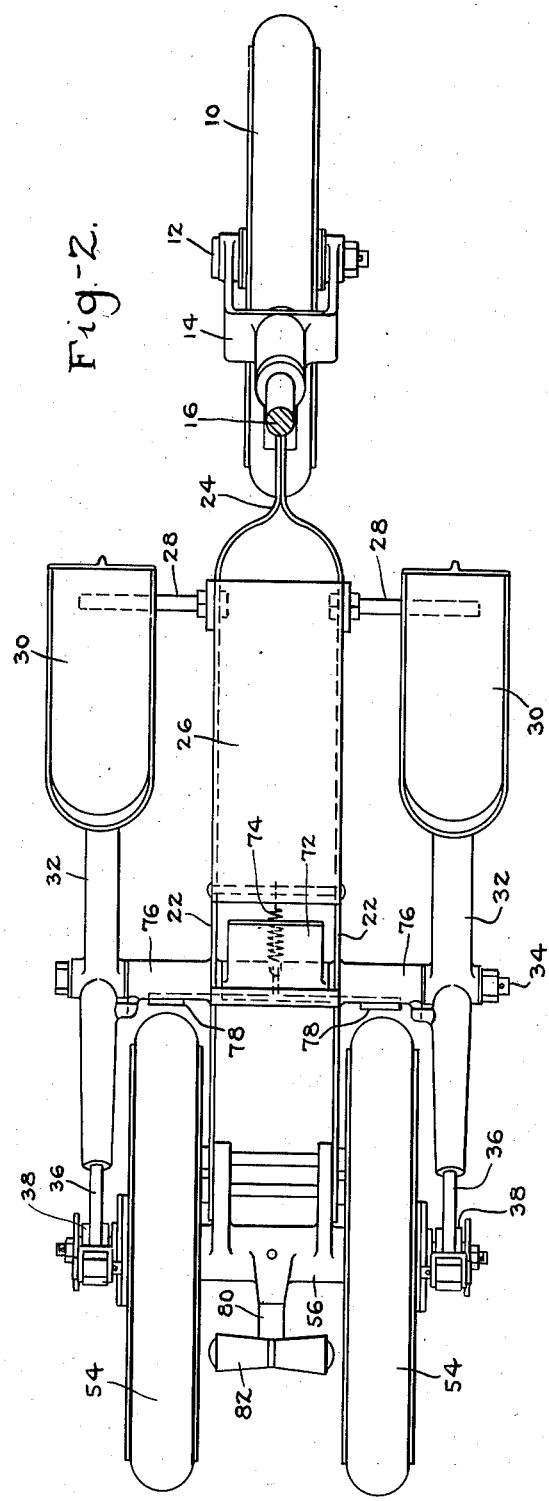
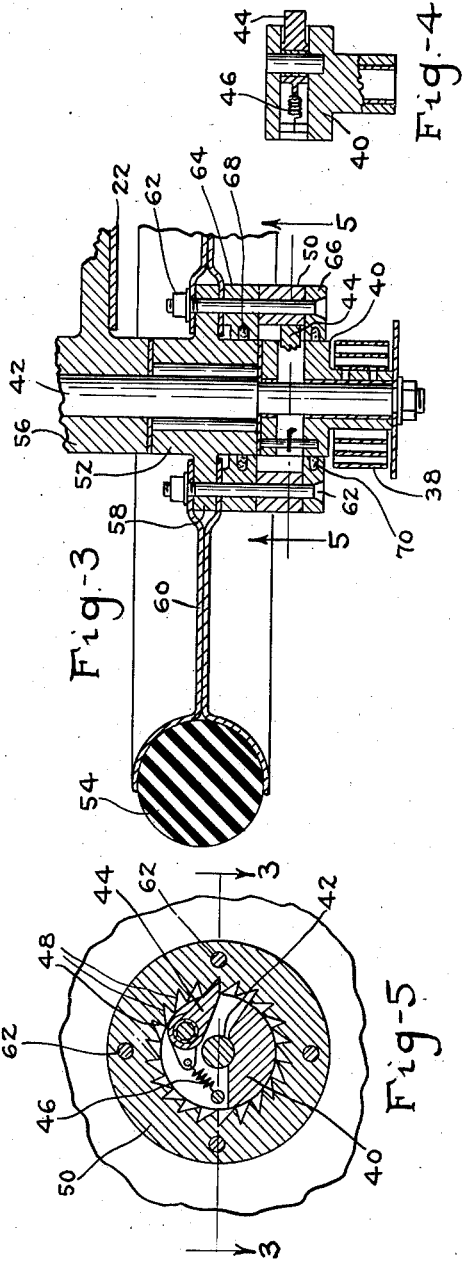
Inventor
Bernhard Bergen
By Whiteley and Ruckman
Attorneys Patented May 24, 1938

2,118,640

UNITED STATES PATENT OFFICE 2,118,640

CHILD'S VEHICLE

Bernhard Bergen, Minneapolis, Minn.

Application July 24, 1937, Serial No. 155,512

3 Claims. (Cl. 280—221)

My invention relates to a child's vehicle and it relates particularly to a device of this character which I designate by the name "pacer". An object of the invention is to provide a device of this character which comprises a wheeled frame, a pair of treadles mounted thereon, and driving connections between the rear wheels and treadles whereby depression of the treadles imparts driving movement to the wheels thereby avoiding the necessity of the rider pushing the vehicle along by engaging one foot with the ground. Other objects are to provide a brake device, to provide stops for limiting the downward movement of the treadles and to provide means whereby the vehicle may be readily lifted.

The novel features which I believe to be characteristic of my invention are set forth with particularity in the appended claims. The invention itself, however, both as to its organization and method of operation, together with additional objects and advantages thereof will be best understood from the following description of a specific embodiment when read in connection with the accompanying drawings in which:—

Fig. 1 is a side elevational view of the device with a small portion in section and broken away.

Fig. 2 is a top plan view.

Fig. 3 is a view in horizontal section on the line 3—3 of Fig. 5.

Fig. 4 is a detail sectional view.

Fig. 5 is a view in vertical section in the line 5—5 of Fig. 3.

Referring to the construction shown in the drawings, it will be apparent that I provide a front wheel 10 having an axle 12 from which a fork 14 extends upwardly and is secured to a rod 16 the upper end of which is provided with a steering wheel 18 to be grasped by the rider of the vehicle. The fork 14 is provided with a rearwardly projecting member 20 to which the forward end of a frame is secured. This frame consists of two side bars 22 which are spaced from each other as shown in Fig. 2 and whose forward ends are brought together and curved upwardly in spaced relation to the front wheel to provide a portion 24 which is secured to the rearwardly projecting member 20. A plate 26 is mounted on the side bars 22. Stop members 28 project out from opposite sides of the bars 22 to limit the downward movement of a pair of treadles 30. These treadles are mounted on the forward ends of levers 32 which are intermediately pivoted on a rod 34 supported by the side bars 22. The rear end portions of the levers 32 slidably carry rods 36 which are attached to the outer ends of spiral springs 38 whose inner ends are secured respectively to collars 40 as shown in Fig. 3, these collars being mounted for turning movement upon a rod 42.

As best shown in Fig. 4, each collar 40 contains an opening in which a pawl 44 is mounted. A spring 46 attached to the pawl tends to hold it in engagement with ratchet teeth 48 formed around the inside of a ring 50. The hubs 52 of a pair of rear wheels 54 are rotatably mounted on the rod 42, it being noted that this rod is supported in a housing 56 secured to the rear of the side bars 22 as shown in Fig. 2. Each hub 52 has a circular flange 58 to which the wheel disk member 60 is secured by bolts 62 which pass through the flange 58 and the disk member 60. The bolts 62 also pass through a ring 64, the internally toothed ring 50, and another ring 66. The ring 64 is provided with packing 68 which engages the outside of the hub 52 while the ring 66 is provided with packing 70 which engages the outside of the collar 40. These packings prevent leaking of lubricant from the pawl and ratchet device.

A foot engageable member 72 is rotatively mounted on the rod 34 and normally held upwardly by a spring 74. The member 72 is attached to sleeves 76 which carry brake shoes 78 one for each rear wheel 54. A bar 80 extends upwardly from the housing 56 and at its upper end is provided with a handle 82 which may be employed for lifting the vehicle.

The operation and advantages of my vehicle will be understood from the foregoing description and the accompanying drawings. The rider ordinarily stands with one foot on each of the treadles 30 and places his weight alternately upon same whereby one of the treadles is depressed while the other is lifted by the spring 38 associated therewith. Downward movement of the treadles acting through the pawl and ratchet devices imparts a driving movement to the rear wheels 54 while the rider guides the vehicle by grasping and turning the steering wheel 18. The stops 28 prevent the treadles from being depressed too far. When the rider wishes to stop the vehicle, he steps on the foot engageable member 72 and thus applies the brake shoes 78. The provision of a pair of alternately operated treadles avoids the necessity of pushing the vehicle along by engaging one foot with the ground. This old manner of operation is not only more tiring for the rider, but the shoe which engages the ground is worn out.

I claim:

1. A child's vehicle comprising a wheeled frame, a pair of treadles, levers intermediately pivoted to the frame and to the front ends of which said treadles are attached, spiral springs to which the rear ends of said levers are attached, collars to which the inner ends of said springs are attached, pawls carried by said collars, rotatively mounted rings having internal ratchet teeth engaged by said pawls, and means securing said rings to the hubs of the rear wheels of the vehicle whereby alternate depression of said treadles imparts driving movement to said wheels.

2. A child's vehicle comprising a wheeled frame, a pair of treadles, levers intermediately pivoted to the frame and to the front ends of which said treadles are attached, spiral springs to which the rear ends of said levers are attached, a rod carried by said frame, collars rotatively mounted on said rod and to which the inner ends of said springs are attached, said collars containing openings, pawls mounted in said openings, rings rotatively mounted on said rod and having internal ratchet teeth engaged by said pawls, means securing said rings to the hubs of the rear wheels of the vehicle whereby alternate depression of said treadles imparts driving movement to said wheels, and packing on both sides of the pawl and ratchet devices for retaining lubricant therein.

3. A child's vehicle comprising a wheeled frame, a pair of treadles, levers intermediately pivoted to the frame and to the front ends of which said treadles are attached, the rear portions of said levers consisting of longitudinally slidable members, spiral springs whose outer ends are attached to the rear ends of said slidable members, and one-way driving connections between the inner ends of said springs and the hubs of the rear wheels of the vehicle whereby alternate depression of said treadles imparts driving movement to said wheels.

BERNHARD BERGEN.